Sept. 15, 1936. B. HALLE 2,054,375
WELDING APPARATUS
Filed Dec. 2, 1929 6 Sheets-Sheet 5
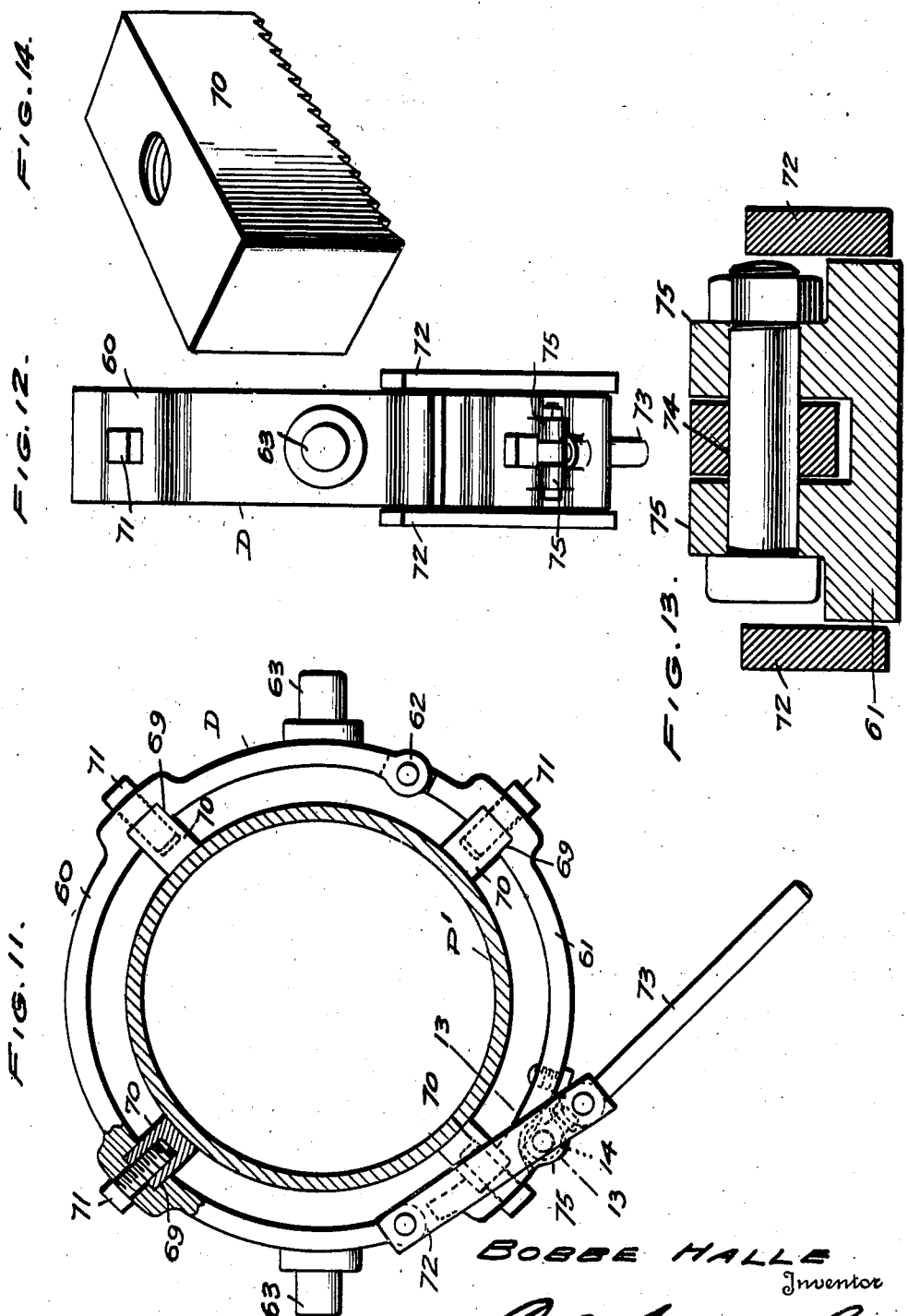

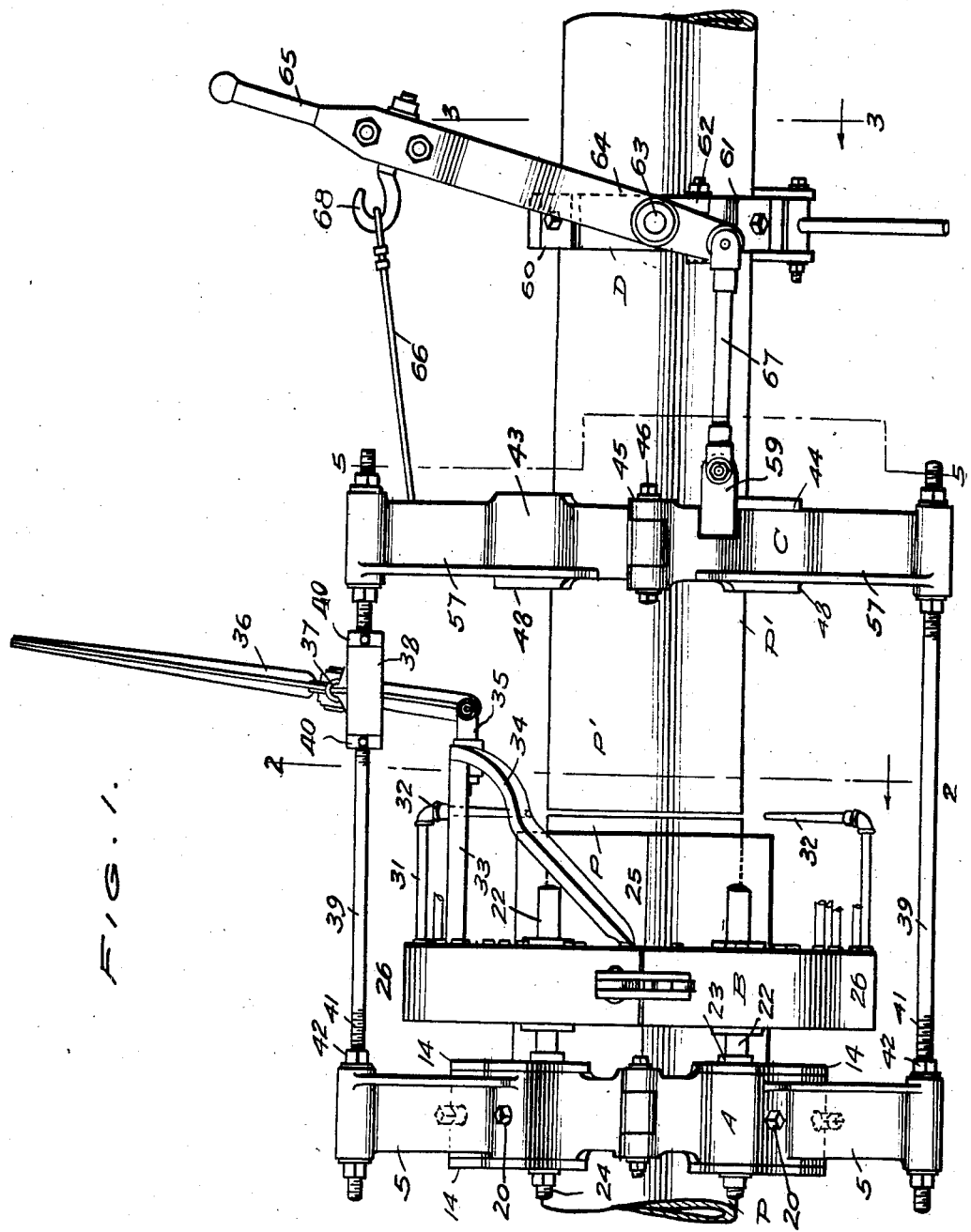

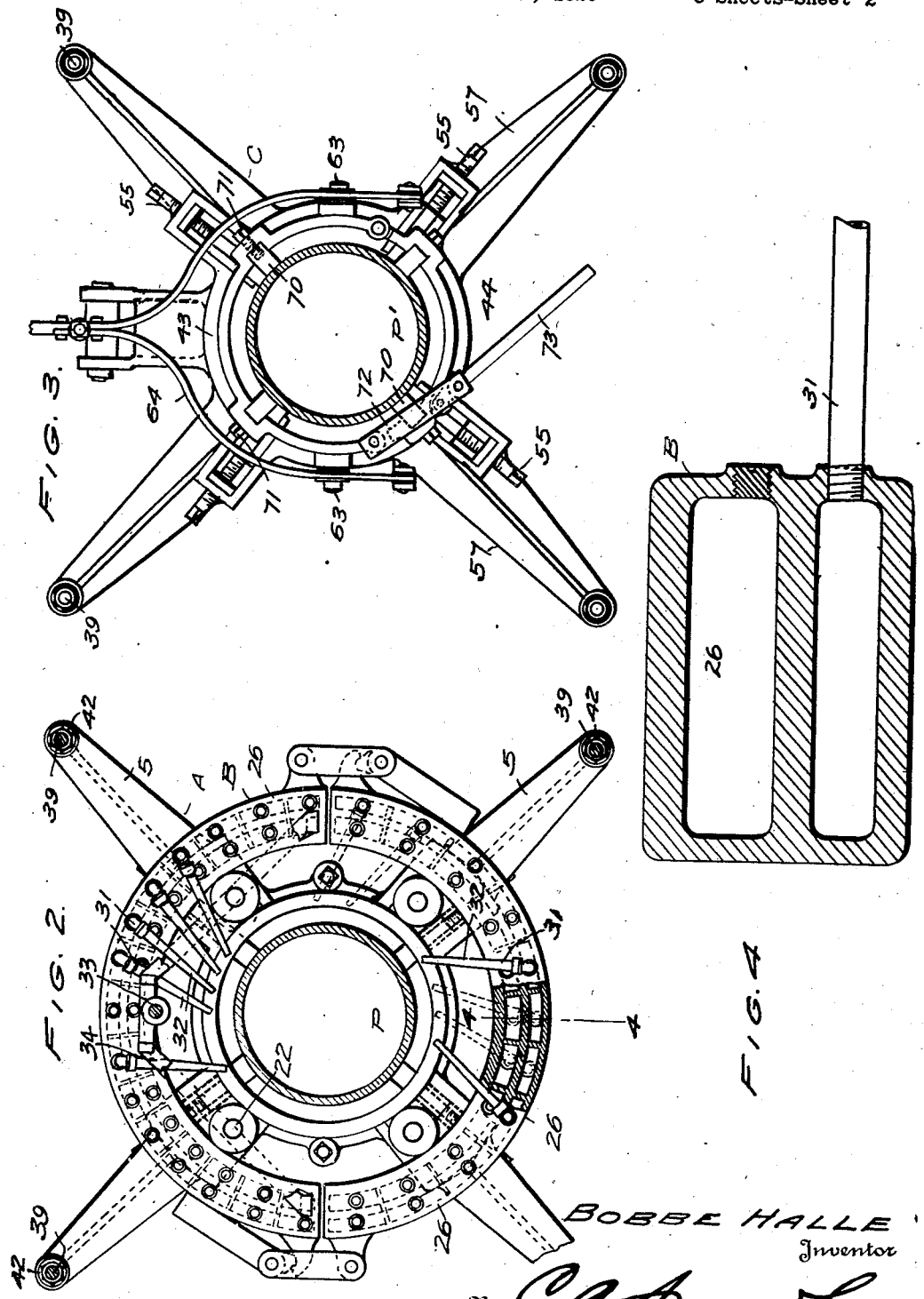

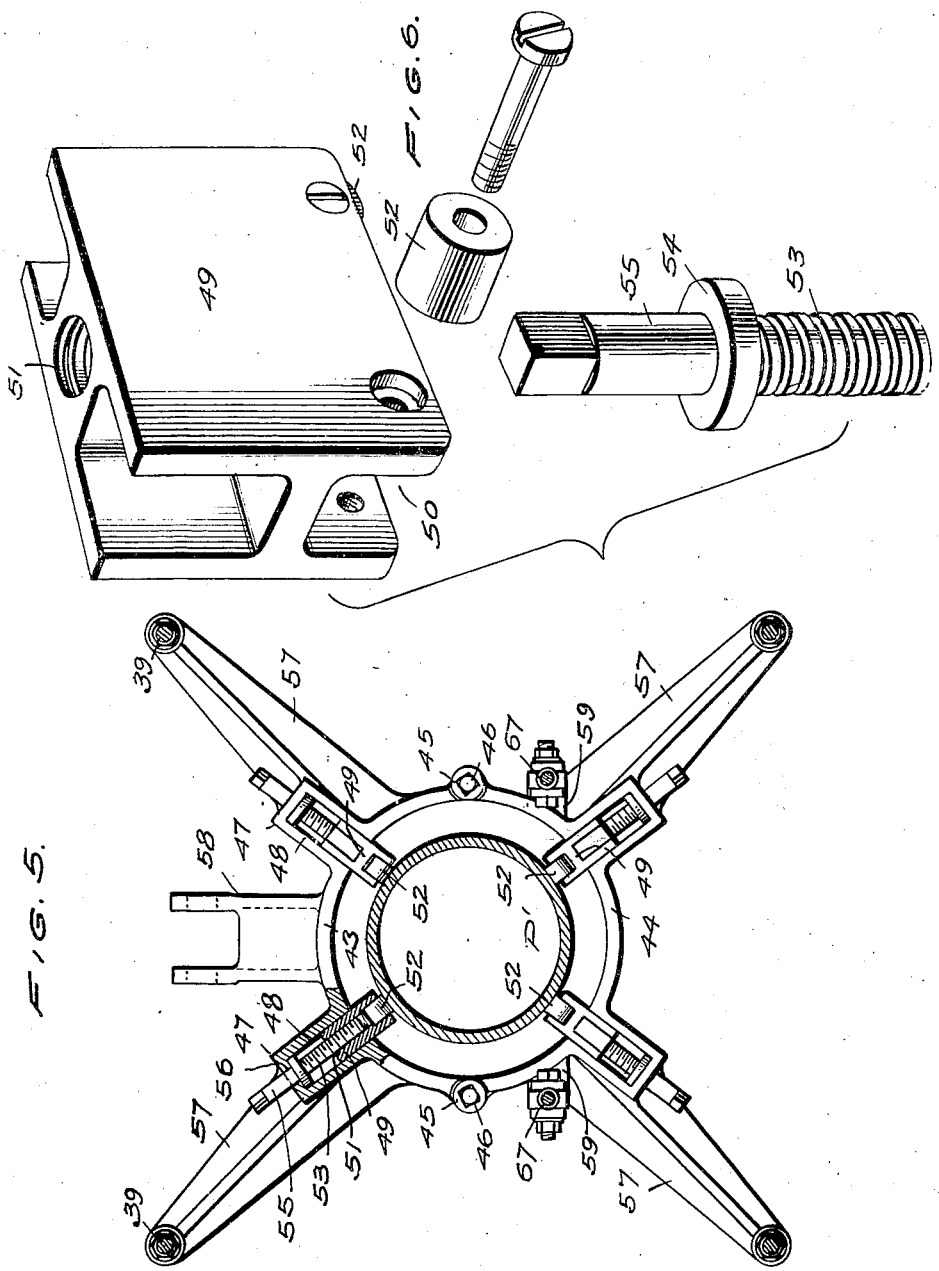

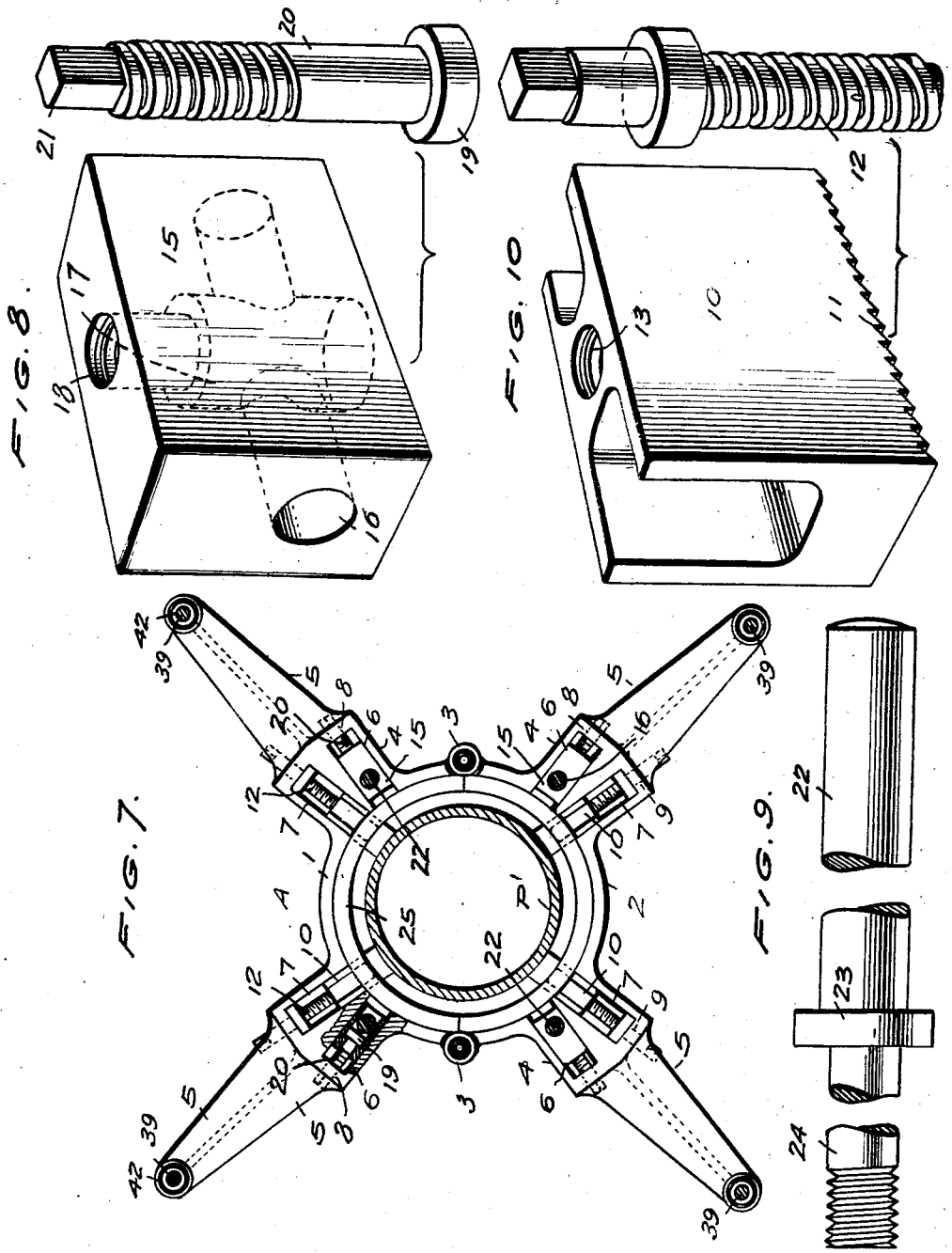

Sept. 15, 1936.  B. HALLE  2,054,375
WELDING APPARATUS
Filed Dec. 2, 1929  6 Sheets-Sheet 6
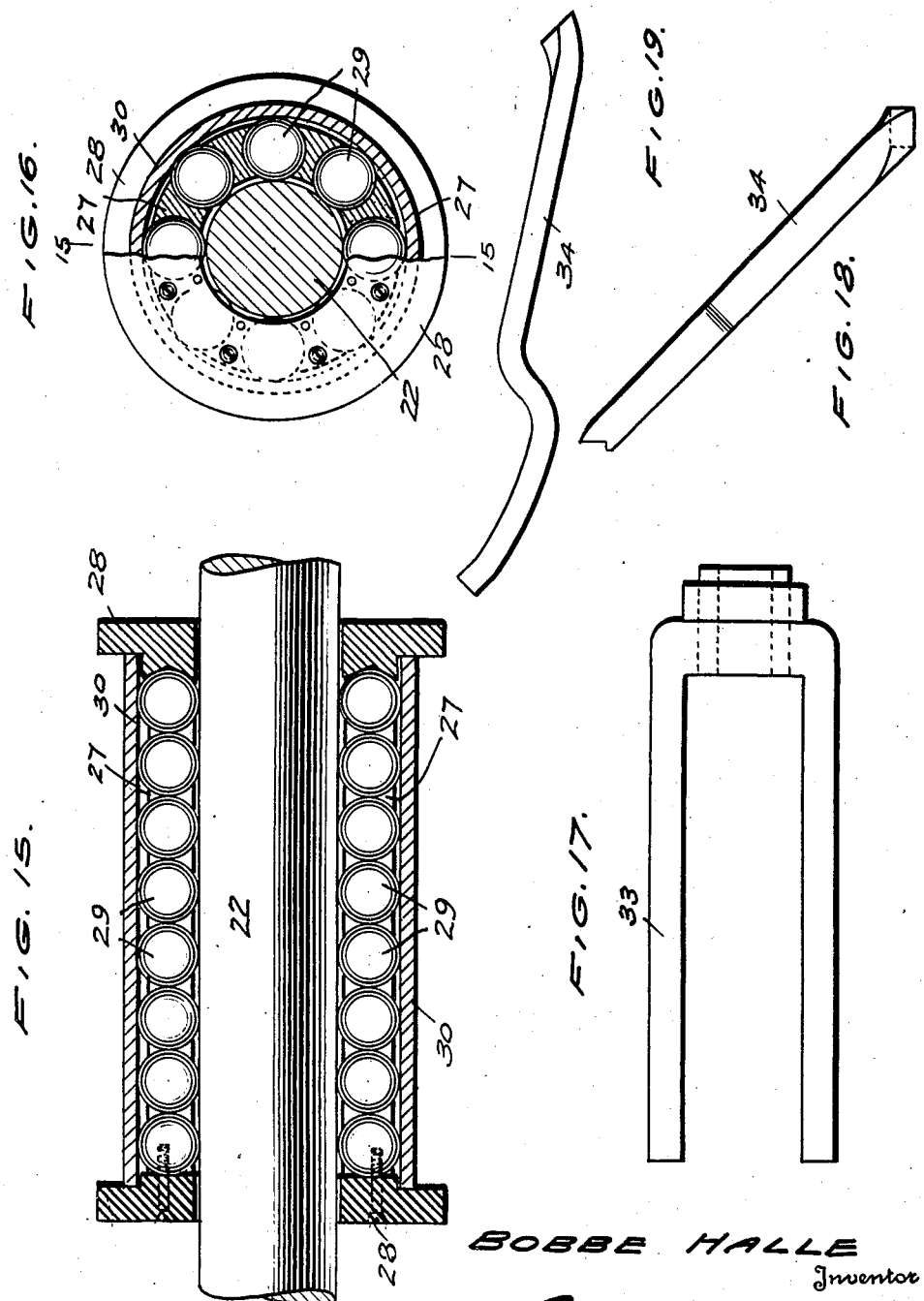
BOBBE HALLE
Inventor Patented Sept. 15, 1936

2,054,375

UNITED STATES PATENT OFFICE 2,054,375

WELDING APPARATUS

Bobbe Halle, Monroe, La., assignor to Fred Stovall, Monroe, La.

Application December 2, 1929, Serial No. 411,138

11 Claims. (Cl. 78—85)

This invention relates to welding apparatus and is more particularly an improvement upon the structure disclosed in my Patent 1,775,311, dated September 9, 1930.

One of the objects of the invention is to provide a means whereby a length of pipe can be properly alined and thereafter readily drawn toward the part to which it is to be joined.

Another object is to provide novel anti-friction means for guiding the pipe during its movement toward the part to which it is to be welded.

A further object is to provide simple and efficient means whereby the apparatus can be joined to pipes of different diameters.

Another object is to provide a means whereby the welding head can be reciprocated during the welding operation so as to distribute the heat over as wide an area as desired.

A still further object is to provide the apparatus with adjustable carriages by means of which it can be moved from one point to another along a pipe line.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of the complete apparatus, parts being broken away and the apparatus being assembled with a pipe.

Figure 2 is a section on line 2—2, Figure 1.

Figure 3 is a section on line 3—3, Figure 1.

Figure 4 is an enlarged section on line 4—4, Figure 2.

Figure 5 is a section on line 5—5, Figure 1.

Figure 6 is a perspective view of the roller carriage and its parts separated.

Figure 7 is a front elevation of the welding head frame with its cover plate removed and parts broken away.

Figure 8 is a perspective view of the pin carriage and its adjusting bolt, the parts being separated.

Figure 9 is a side elevation of the pin adapted to be connected to the carriage, parts being broken away.

Figure 10 is a perspective view of the clamp block used in the welding head frame, its adjusting screw being separated therefrom but shown therewith.

Figure 11 is a detail elevation of the pipe clamp, a portion being in section, the pipe on which it is mounted being also in section.

Figure 12 is a side elevation of the pipe clamp.

Figure 13 is an enlarged section on line 13—13, Figure 11.

Figure 14 is a perspective view of one of the clamping jaws carried by the clamp.

Figure 15 is a longitudinal section through the ball bearing mounted on one of the pins and carrying the welding head.

Figure 16 is a view partly in end elevation and partly in section showing a portion of the removable head of the bearing.

Figure 17 is a plan view of the yoke on the welding head.

Figure 18 is a side elevation of one of the braces used with the yoke.

Figure 19 is a front elevation thereof.

In constructing the apparatus, four units are provided, namely, a welding head frame, a welding head, a pipe alining frame, and a pipe clamp. These have been indicated at A, B, C, and D, respectively, and, in Figure 1, have been shown properly assembled on pipes P and P' which are to be joined.

The welding head frame is formed of two opposed yokes 1 and 2 the ends of which are connected by hinge bolts 3 either or both of which can be removed readily whereby the yokes can be completely separated or can be swung apart when it is desired to place them in position around a pipe or to remove them therefrom. The two yokes are duplicates and each of them is provided with a pair of radial extensions 4 having a radial arm 5 projecting from each extension.

Each of the extensions 4 is recessed to provide a pin housing 6 and a clamp housing 7, there being a threaded opening 8 in the outer end of each housing 6 and another opening 9 in the outer end of each housing 7.

Seated in each clamp housing 7 is a clamp jaw 10 in the form of a block adapted to slide longitudinally of the housing and provided along its inner exposed face with teeth 11 designed to bite into the outer surface of the pipe P with which the welding head frame is assembled. A screw 12 is swiveled in each opening 9 and engages a threaded bore 13 in each jaw 10. Thus by rotating each screw 12, its jaw can be adjusted inwardly against the pipe P or can be withdrawn from engagement with the pipe. Obviously, in this way, the welding head frame A can be tightly secured to the pipe so as to be held against movement longitudinally thereof.

Cover plates 14 are arranged upon the faces of the extensions 4 and are used for retaining the jaws 10 against displacement relative to their housings.

In each of the housings 6 is located a pin carriage or block 15 having a bore 16 extending from end to end thereof and intersected at the center by the counterbored end 17 of a bore 18 opening through that surface of the carriage nearest the opening 8. The head 19 of a bolt 20 is seated in the inner portion of the counterbore and this bolt is adapted to extend through the opening 8 the thread of which is engaged thereby. The projecting end of the bolt is made angular as shown at 21 for engagement by a wrench. Thus by turning the bolt the carriage 15 can be adjusted toward or from the opening 8.

A bearing pin 22 is extended from each carriage 15. This pin has a collar 23 and one end portion of the pin, indicated at 24, is adapted to fit in the bore 16 where it can be held by a nut engaging one end of the pin. Pin 22 extends through the cover plates 14 and can be used for clamping them against the extensions 4. It will be obvious, however, that the openings provided for the pin in the cover plates must be sufficiently large to permit radial adjustment of the carriages 15 and the pins carried thereby.

If desired, and as shown in Figure 1, a ventilation sleeve 25 can be extended from one side of the welding head frame A between the pins 22. This sleeve 25 can be made concentric with the cover plates 14 and can be made of two semi-cylindrical sections adapted to open apart when the frame A is opened and to close together when the frame is closed about the pipe P.

The welding head B is formed of two opposed sections 26 adapted to abut at their ends to form a split ring. Each section is cored for the distribution of fuel therein and the ends of the sections may be held together by any suitable means provided for that purpose. One such means has been disclosed in my co-pending application hereinbefore mentioned and it has not been deemed necessary to show or describe the same in detail in the present case.

For the purpose of mounting the welding head so that it can be shifted toward or from the welding head frame A and also be rotated, bearings of novel construction are mounted on the respective pins 22. Each of these bearings includes a cylindrical cage 27 provided at its ends with annular flanges 28. Parallel longitudinal series of balls 29 are seated in the cage and project inwardly and outwardly therefrom. The inwardly projecting portions of the balls are adapted to engage the pin 22 extending through the cage. The outwardly projecting portions of the balls engage the inner surface of a cylindrical wear sleeve 30 supported between the flanges 28 and engaging the inner periphery of the welding head B. Thus it will be seen that this head can be rotated easily on the bearings provided therefor and can also be shifted readily toward or from the frame A at which time the cages 27 will travel along the pins 22.

An annular series of burners 31 is extended laterally from the welding head, the tips 32 of these burners being extended toward each other beyond the end of the ventilating sleeve where jets of flame issuing from the tips will come against the pipes at the points where they are to be fused.

A yoke 33 is welded on one face of the head B and has braces 34 welded thereto and to the head, these braces being so shaped as to extend outside of the ventilating sleeve 25 and between the adjacent burner tips. A bracket 35 extends from the yoke 33 and is pivotally connected to one end of an operating lever 36. This lever is fulcrumed at 37 on a sleeve 38 which, in turn, is rotatably mounted on a tie rod 39 between collars 40 carried by the rod. The tie rod is extended from one of the arms 5. Obviously by swinging lever 36 relative to sleeve 38 the welding head can be moved back and forth along the pins 22, carrying with it the cages 27. Thus the tips of the burners can be reciprocated relative to the pipes being treated. By swinging lever 36 laterally, the sleeve 38 will be rotated back and forth and the welding head can thereby be given a slight back and forth rotation during the welding operation.

Each of the arms 5 of the frame A has a tie rod 39 extending from it. These rods are all parallel and have their ends screw-threaded as shown at 41. The rods are securely fastened by nuts 42 in the outer ends of arms 5. The other ends of the rods are connected to the pipe alining frame C.

As shown particularly in Figure 5 the pipe alining frame includes opposed yokes 43 and 44 connected at their ends by hinges 45. Either or both of these hinges can be separated by removing its bolt 46 so that it is thus possible readily to place the frame C about the pipe to be joined to the assembled portion of a pipe line. Each of the sections or yokes 43 and 44 has a pair of extensions 47 radiating therefrom and each extension is recessed as at 48 to provide a housing for a carriage 49. This carriage includes a block having a channel 50 and a threaded bore 51 opening into the middle portion of the channel. Rollers 52 are journaled in the end portions of the channel 50 while the bore 51 is engaged by an adjusting screw 53. This screw has a collar 54 adapted to be seated in the end of the recess 48 and also has a stem 55 projecting through an opening 56 in the outer end of the recess. The end of the stem is made angular so that it can be engaged by a wrench and rotated readily to feed the carriage 49 toward or from the pipe P' on which the frame C is adapted to be mounted. Arms 57 radiate from the yokes 43 and 44 and are made integral with the extensions 47. Rods 39 are secured to the outer ends of these arms 57 so that the pipe alining frame is thus held fixed relative to the welding head frame A. Spaced ears 58 are extended from section 43 between arms 57 and lugs 59 are connected to the yoke 44 adjacent to the ends thereof.

The pipe clamp D is formed of an upper yoke 60 and a lower yoke 61. These are hingedly connected at 62 and the upper yoke has diametrically opposed trunnions 63 on which are fulcrumed the oppositely bowed arms 64 of a lever 65. The upper portion of this lever is connected by a cable 66 to the ears 58 while the lower ends of the arms 64 are connected by rods 67 to the lugs 59. The connection between the cable and ears 58 can be of such a nature as to permit slack to be taken up in the cable after said cable has been placed in engagement with a hook 68 carried by lever 65.

Each of the yokes 60 and 61 has a pair of recesses 69 in which are seated clamping jaws 70 held in place by screws 71. These jaws are adapted to bind tightly against and bite into pipe P' when the clamp is assembled therewith.

The free end of yoke 60 has spaced links 72 pivotally connected thereto and pivotally mounted between these links is a lever 73 the end of which is pivoted at 74 to an ear 75 outstanding from the free end portion of yoke 61. Thus it will be seen that when lever 73 is swung in one direction it will close the yokes tightly about the pipe P' and cause the jaws 70 to bite thereinto. However, when the lever is swung in the opposite direction, the yokes will be swung apart and will release the jaws from the pipe.

As is well known to those skilled in the art it is necessary, when laying pipe lines such as used for conducting gas over extensive areas, to join the pipes by welding them. Several lengths of pipe have been assembled end to end and connected at each joint by the use of several blow torches. It has been necessary to carefully roll the pipes during the welding operation so as to keep them in proper alinement. After several sections have thus been joined they are brought bodily into position against and in alinement with the length of pipe previously operated on and then, by means of blow torches, a joint is made. This operation is very slow and laborious and is difficult to perform accurately. Furthermore it requires the use of a gang of approximately fifty men.

The present apparatus is designed to overcome the objections heretofore present in laying overland pipe lines for natural gas and the like. In using the apparatus the frame A is placed about the fixed pipe P with the ventilating sleeve 25 extending close to the end of the pipe and the tips of the burners directed toward said end, it being understood, of course, that the welding head B is mounted on the guide pins 22.

Thereafter pipe P' is placed in the alining frame C through which it can move readily upon the rollers 52. Clamp D is secured to the pipe and by shifting lever 65 the two pipes can be caused to bear firmly together. The fuel is ignited at the tips of the burner and jets of flame will be directed against the meeting ends of the pipes. During this operation, lever 36 can be actuated to reciprocate and rotate the welding head so that the jets of flame will be applied to all portions of the ends of the pipes. When the metal begins to fuse lever 65 can be shifted to pull through rods 67 upon frame C and, through rods 39, upon frame A. Thus the clamp D will draw pipe P' longitudinally so as to insure proper joining of the pipes while the metal is being fused. This shifting of the lever can be effected by a direct pull thereon or by means of the take-up provided for the cable 66. As before explained, any suitable means can be used for taking up the cable.

After the parts have been joined as explained the jaws in the frame A are retracted from engagement with pipe P and the clamp D is disengaged from pipe P'. The entire apparatus is then drawn bodily along the joined pipes until it is brought to the position first described whereupon the operation can be repeated.

What is claimed is:

1. A portable apparatus for fusing together the ends of pipe line sections, including a separable welding head frame for surrounding a pipe, means for fastening the same to a pipe line section, guide pins extending from the frame along lines parallel with the axis of the pipe, anti-friction devices rotatable on and movable longitudinally of the pins, a ring-like welding head for encircling the pipe, said head being mounted on and centered by the anti-friction devices, means for rotating the welding head on the anti-friction devices and a connection operated by said means for shifting the welding head with said devices along the pins.

2. A portable apparatus for fusing together the ends of pipe line sections including a separable welding head frame for surrounding a pipe line section, means for fixedly attaching it to a pipe line section, a separable ring-like welding head mounted to slide and rotate relative to said frame, means extending from the frame for guiding it longitudinally of the pipe section during its sliding movement, a pipe alining element joined to the frame, anti-friction means therein for engagement by a movable pipe line section extending through said element, and means connected to the pipe alining element and to the movable pipe line section for shifting said movable section within the alining element and toward the welding head frame.

3. A portable apparatus for fusing together the ends of pipe line sections including a welding head frame, means for securing the same to a stationary pipe line section, an alining frame, pipe-engaging anti-friction devices therein, means for tying together the welding head frame and the pipe-alining frame, means for gripping a movable pipe line section projecting into the alining frame, means carried by the welding head frame for fusing the meeting ends of the pipe line sections, and cooperating means on the alining frame and the section gripping means for feeding the movable section toward the stationary section during the fusing operation.

4. A portable apparatus for fusing together the ends of pipe line sections including hingedly connected yokes constituting a welding head frame for surrounding a pipe line section, jaws adjustably mounted in the yokes for gripping said pipe line section, means for holding the yokes against relative movement, blocks adjustably mounted in the yokes, guide pins extending therefrom, anti-friction bearings mounted to slide and rotate on the pins, a separable welding head for encircling the pipe line section and mounted to rotate on the bearings and to slide therewith, means for rotating the welding head and a connection operated by said means for sliding the welding head.

5. A portable apparatus for fusing together pipe line sections including a sectional welding head frame adapted to embrace and to be fixedly attached to a stationary pipe line section, a clamp adapted to engage a movable pipe line section, an alining frame formed of sections adapted to embrace the movable pipe line section, anti-friction means therein for guiding said section, a connection between the welding head frame and the alining frame, an operative connection between the alining frame and the clamp for shifting the movable pipe line section against the stationary pipe line section, and means carried by the welding head frame for fusing the meeting ends of the pipe line sections.

6. A portable apparatus for fusing together the ends of pipe line sections, including a separable welding head frame for surrounding a pipe line section, means for fastening the same to a pipe line section, annularly spaced guide pins extending from the frame and parallel with the axis of the section, anti-friction devices adapted to roll about and longitudinally of the respective guide pins, a separable ring-like welding head for surrounding the pipe line section and mounted on and centered by the anti-friction devices, means for rotating the welding head on the anti-friction devices and about the guide pins and a connection actuated by said means for shifting the welding head and the anti-friction devices longitudinally of the guide pins.

7. A portable apparatus for fusing together the ends of pipe line sections including a member for attachment to one section of a pipe line, a clamp for attachment to another section, a separable alining frame interposed between said member and the clamp for encircling and guiding the pipe section engaged by the clamp, means extending from said member for holding the alining frame fixed relative thereto, a welding head for encircling one pipe line section and supported between said member and the alining frame for fusing the meeting ends of the pipe sections, said welding head being rotatably mounted relative to the member, and means connecting the clamp and the alining frame for feeding one of the pipe sections toward the other during the fusing operation.

8. A portable apparatus for fusing together the ends of pipe line sections including annularly spaced parallel guide pins, separable means for surrounding a pipe and coupling the guide pins to a pipe line section, anti-friction devices mounted to slide and rotate on the respective guide pins, a separable welding head for surrounding a pipe, said head being centered by said devices and mounted to rotate thereon and to slide therewith, means for rotating the welding head and a connection operated by said means for sliding the welding head.

9. A portable apparatus for fusing together the ends of pipe line sections including a ring-like welding head frame for surrounding a pipe line section, means for clamping the same upon said pipe section, annularly spaced guide pins connected to said frame and adjustable radially of and relative to the frame, said pins being parallel, a ring-like welding head for surrounding the pipe section and mounted to rotate on and to slide longitudinally of the pins, means for rotating the welding head, a connection operated by said means for sliding the welding head, and means for drawing a pipe line section toward the section on which the frame is mounted.

10. In a machine for welding together the meeting ends of pipes and the like, a carriage, means for mounting the carriage for movement upon and longitudinally of the pipes, a welding mechanism, means for mounting the welding mechanism upon the carriage for rotation about the pipes, and means for rotating the welding mechanism as aforesaid.

11. In a machine for welding the meeting ends of pipes or the like, a carriage, means for mounting the carriage for movement longitudinally of the pipes, a rotary member journalled on the carriage and disposed about the pipes, a welding mechanism on the rotary member, and means for rotating the rotary member to cause the welding mechanism to move circumferentially of the pipes.

BOBBE HALLE.